Dec. 17, 1968　　　K. MAICHEN　　　3,416,382
INFINITELY VARIABLE FRICTION GEARING
Filed July 12, 1966

INVENTOR
KARL MAICHEN
BY
ATTORNEY

United States Patent Office 3,416,382
Patented Dec. 17, 1968

3,416,382
INFINITELY VARIABLE FRICTION GEARING
Karl Maichen, Thalackerstrasse 12, Lauterach, Austria
Filed July 12, 1966, Ser. No. 564,639
Claims priority, application Austria, July 15, 1965,
A 6,513/65
4 Claims. (Cl. 74—193)

ABSTRACT OF THE DISCLOSURE

Axially displaceable pairs of bevel wheels on driving and driven shafts grip a peripheral section of a contact ring. One pair of wheels is resiliently urged together while the other pair of wheels is engaged by thrust members which stabilize such wheels and control their axial separation to vary the drive ratio between the shafts.

Summary of the invention

This invention relates to an infinitely variable friction gearing, which enables a smooth transmission of high torques even in rough usage and for this reason is particularly suitable for use in motor vehicles and machine tools.

It is an essential feature of the invention that the gearing comprises at least one driving shaft and one driven shaft, each of said shafts carrying a pair of bevel wheels, said bevel wheels being displaceably mounted on said shafts and coupled to said shafts for rotation therewith, the small ends of said bevel wheels of each pair facing each other, a rolling contact ring being provided, which connects said pair of bevel wheels of the driving shaft to said pair of bevel wheels of the driven shaft, said rolling contact ring being gripped between said pairs of bevel wheels, the bevel wheels of one of said pairs contacting the inside peripheral surface of the rolling contact ring on both sides thereof, and the bevel wheels of the other pair contacting the outside peripheral surface of the rolling contact ring on both sides thereof.

According to another feature of the invention, pairs of bevel wheels, which are connected to the driving shaft and act as planet wheels, are spaced around the output pair of bevel wheels, and each pair of said pairs of planet bevel wheels are coupled by a separate rolling contact ring to the pair of output bevel wheels.

It is a further feature of the invention that the bevel wheels of one of said pairs are supported by spring means whereas the bevel wheels of the other pair engage an adjustable abutment.

Finally it is a feature of the invention that said rolling contact ring is provided with an inner backing ring of stiff material.

Two embodiments of the friction wheel gearing according to the invention are shown by way of example on the drawing.

Figure 1:
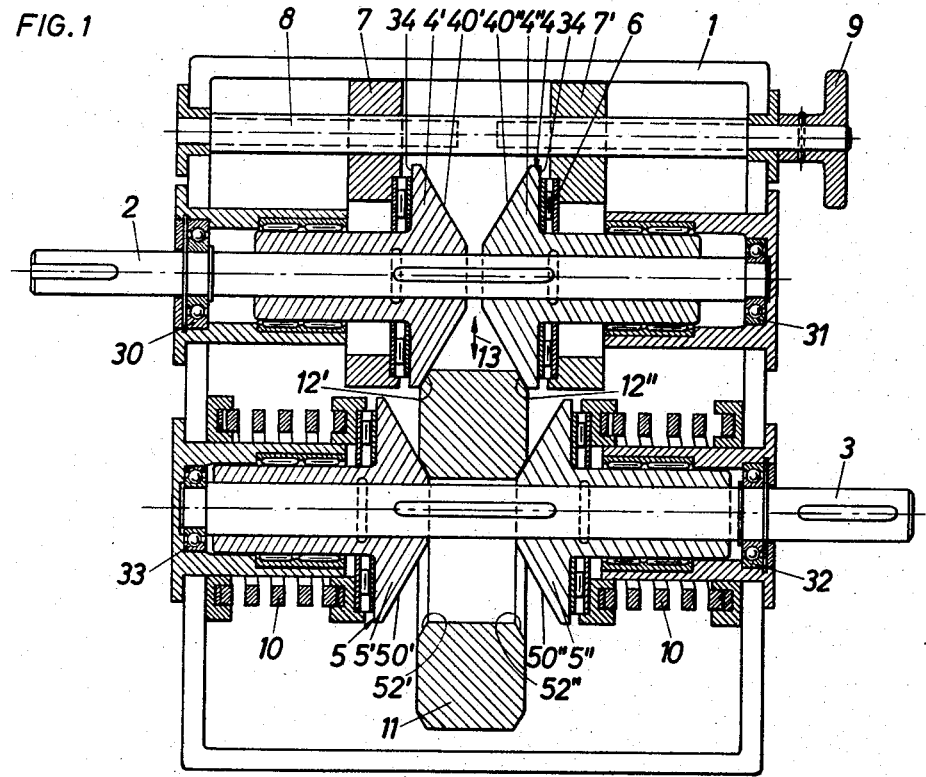
FIG. 1 is an axial longitudinal sectional view showing the gearing with two pairs of bevel wheels.

In the embodiment of the friction gearing shown in FIG. 1, a driving shaft 2 is mounted in bearings 30 and 31 and a driven shaft 3 is mounted in bearings 32 and 33 in a housing 1. Each of the shafts 2, 3 carries a pair of bevel wheels 4 and 5, which are axially displaceable on the shaft and coupled to it for rotation. The bevel wheels 4', 4" of the pair of bevel wheels 4 bear with their large end by means of a bearing 6 on an associated stop 7 or 7', which is provided with female screw threads and which is mounted on a threaded rod 8, which is rotatably mounted in the housing 1 and held against axial displacement. The hands of the screw threads of the two stops 7, 7' and the associated portions of the rod 8 are mutually opposed so that a rotation of the rod 8 by means of a driving disc 9 will cause the stops to move toward and apart from each other.

Springs 10 are provided to urge the bevel wheels 5', 5" of the pair of bevel wheels 5 on the driven shaft 3 against each other by resilient force.

Motion is transmitted from one pair of bevel wheels to the other by a friction ring 11, which consists preferably of plastics material and is gripped between the confronting rolling contact faces 40', 40" and 50', 50" of the pairs of bevel wheels 4, 5. To ensure an adequate friction between the transmitting elements, the edges 12', 12" and 52', 52" of the friction ring 11 are beveled so that there is a linear contact. As is apparent from the drawing, the rolling contact faces 40', 40" engage the outer edges 12', 12" and the rolling contact faces 50', 50" engage the inner edges 52', 52".

The gearing operates as follows:

The driving shaft 2 drives the pair of bevel wheels 4, which drive by means of the friction ring 11 the pair of bevel wheels 5 and consequently the driven shaft 3. A particularly high efficiency is achieved by the use of plastics material for the friction ring. To change the degree of torque conversion, it will be sufficient to adjust the stops 7, 7' by means of the disc 9, either by hand or by a control means, which may be automatically operated. Under the influence of spring 10, the friction ring 11 will then be shifted toward one side or the other, as is indicated by the arrow 13, and will contact the beveled friction wheels on a different diameter.

It will be obvious that the functions of the driving and driven shaft in the present gearing can be interchanged.

Figure 2:
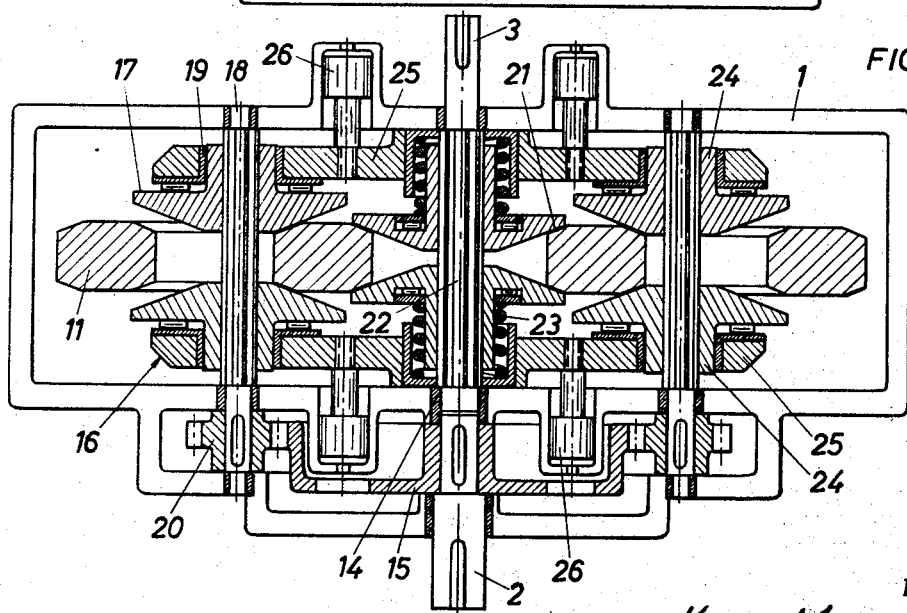
FIG. 2 is an axial longitudinal sectional view showing a second embodiment of the gearing having a group of planet wheels.

In the embodiment of the transmission shown in FIG. 2, the driven shaft 3 is coaxial to the driving shaft 2. The adjacent ends of the shafts are mounted in a common bushing 14. The driving shaft 2 drives by means of a gear 15 a series of wheels 16, each of which comprises a pair of bevel wheels 17. The bevel wheels of these pairs are axially displaceably mounted on a shaft 18, which is rotatably mounted in the housing 1. By a tongue-and-groove joint 19, the bevel wheels of pairs 17 are coupled to the shaft 18 for rotation therewith. A gear 20 is also keyed to the shaft 18 and in mesh with the gear 15. Just as the pair of bevel wheels 4 of the embodiment shown in FIG. 1, each pair of the bevel wheels 17 of all wheels 16 are coupled by a friction ring 11 to a common pair of bevel wheels 21, which are connected to the driving shaft 3 by a tongue-and-groove joint 22.

The contact pressure for the pair of bevel wheels 21 is produced by springs 23. The support and adjustment of the pairs of bevel wheels 17 of the wheels 16 is effected by hydraulic or pneumatic means. For this purpose each of those bevel wheels of the pairs of bevel wheels 17 which lie in the same plane has hub 24, through which the shaft 18 extends, and these hubs are mounted in a common pressure plate 25, which is axially moved by pistons 26, to which hydraulic or pneumatic pressure is admitted.

The torque conversion and the change thereof are effected in a manner which is similar to that of the embodiment of FIG. 1.

Figure 3:
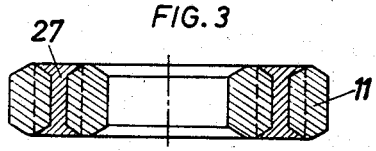
FIG. 3 is a transverse sectional view showing a modification of the rolling contact ring.

Depending on the forces to be transmitted, various designs may be adopted for the friction ring 11. As is shown in FIG. 3, a metallic reinforcing ring 27 may be embedded in the body of plastics material (FIG. 3).

What is claimed is:

1. An infinitely variable friction gearing, comprising at least one driving shaft and one driven shaft, each of said shafts carrying a pair of bevel wheels, said bevel wheels being displaceably mounted on said shafts and coupled to said shafts for rotation therewith, the small ends of said bevel wheels of each pair facing each other, a rolling contact ring being provided, which connects said pair of bevel wheels of the driving shaft to said pair of bevel wheels of the driven shaft, said rolling contact ring being gripped between said pairs of bevel wheels, the bevel wheels of one of said pairs contacting the inside peripheral surface of the rolling contact ring on both sides thereof, and the bevel wheels of the other pair contacting the outside peripheral surface of the rolling contact ring on both sides thereof.

2. A friction gear as set forth in claim 1, wherein a further pair of bevel wheels are connected to the driving shaft, said further pair of bevel wheels being coupled by a separate rolling contact ring to the pair of bevel wheels on said output shaft.

3. A friction gearing as set forth in claim 1, characterized in that the bevel wheels of one of said pairs are supported by spring means and the bevel wheels of the other pair engage an adjustable abutment.

4. An infinitely variable friction gearing comprising, in combination, a driving shaft and a driven shaft disposed in spaced, parallel relation, a pair of bevel wheels on said driving shaft, a pair of bevel wheels on said driven shaft, said bevel wheels being axially displaceable on their respective shafts and coupled thereto for rotation therewith, the small ends of said bevel wheels of each pair facing each other, means resiliently urging one pair of bevel wheels toward each other, a pair of thrust members engaging the outer face of the other pair of bevel wheels, a contact ring interposed between said pair of bevel wheels for imparting drive therebetween, and means for displacing said thrust members toward and away from each other to vary the drive ratio between said shafts and maintain said other pair of bevel wheels in alignment with each other.

References Cited

UNITED STATES PATENTS

| 2,032,015 | 2/1936 | Heynau | 74—193 |
| 2,330,136 | 9/1943 | Nardone | 74—192 |
| 1,709,346 | 4/1929 | Garrard | 74—193 |

FOREIGN PATENTS

| 339,920 | 12/1930 | Great Britain. |
| 593,772 | 10/1947 | Great Britain. |
| 698,446 | 10/1953 | Great Britain. |
| 1,353,802 | 1/1964 | France. |

C. J. HUSAR, *Primary Examiner.*